United States Patent
Sato et al.

(10) Patent No.: US 7,589,137 B2
(45) Date of Patent: Sep. 15, 2009

(54) RESIN COMPOSITION AND MOLDED PRODUCT OBTAINED THEREFROM

(75) Inventors: Noritaka Sato, Kanagawa (JP);
Tsutomu Noguchi, Kanagawa (JP);
Hiroyuki Mori, Kanagawa (JP); Yuko Fujihira, Kanagawa (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 11/380,135

(22) Filed: Apr. 25, 2006

(65) Prior Publication Data

US 2006/0247340 A1    Nov. 2, 2006

(30) Foreign Application Priority Data

Apr. 28, 2005   (JP) .......................... P2005-132132

(51) Int. Cl.
*C08K 5/3492*  (2006.01)
*C08K 7/16*    (2006.01)

(52) U.S. Cl. ..................... 524/100; 523/223
(58) Field of Classification Search .............. 524/100; 523/223
See application file for complete search history.

(56) References Cited

U.S. PATENT DOCUMENTS

| 2004/0234603 A1* | 11/2004 | Baum et al. ............. 424/486 |
| 2004/0254270 A1* | 12/2004 | Harashina ................. 524/86 |
| 2005/0209377 A1 | 9/2005 | Padwa |

FOREIGN PATENT DOCUMENTS

| JP | 9278991 | 10/1997 |
| JP | 10158369 | 6/1998 |
| JP | 11005849 | 1/1999 |
| JP | 11116783 | 4/1999 |
| JP | 2004352872 | 12/2004 |
| JP | 2004352873 | 12/2004 |
| WO | 2005066256 | 7/2005 |

* cited by examiner

*Primary Examiner*—Kriellion A Sanders
(74) *Attorney, Agent, or Firm*—K&L Gates LLP

(57) ABSTRACT

A resin composition includes a polyester capable of forming a crystal structure, at least one member selected from uracil and a uracil derivative used as a nucleating agent. A resin molding obtained from the composition is also provided.

7 Claims, No Drawings

RESIN COMPOSITION AND MOLDED PRODUCT OBTAINED THEREFROM

CROSS REFERENCES TO RELATED APPLICATIONS

The present application claims priority to Japanese Patent Application JP 2005-132132 filed in the Japanese Patent Office on Apr. 28, 2005, the entire contents of which is being incorporated herein by reference.

BACKGROUND

This invention relates to a resin composition comprised of a polyester capable of taking a crystal structure and also to a molded product using the resin composition. More particularly, the invention relates to a technique of facilitating crystallization of a biodegradable resin and ensuring satisfactory durability during practical use.

As a recent tendency toward environmental consciousness is increasing, attention has been paid to use of resin materials that are degradable in a natural environment and thus have so-called biodegradability.

Unlike hitherto known general-purpose resins, resins having biodegradability are prepared, for example, from nonfossil fuels and thus, have advantages: no problem is involved in shortage of resources; such resins contribute to resolution of a problem on waste treatment since they are degradable in a natural field; they are obtainable from natural resources such as sweet corn and the like; and the amount of $CO_2$ gas that has been accepted as causing global warming can be suppressed. Hence, these resins are materials that are promised to attract further attention in future.

Among degradable resins, aliphatic polyesters, particularly polylactic acid, are high in melting point (170 to 180° C.), and are so excellent in material characteristics that the molded product obtained therefrom has good transparency, thus being expected as having wide utility.

It has been accepted that main applications of these biodegradable resins include, for example, materials for agriculture, forestry and fisheries (films, planting pots, fishing lines, fishnets and the like), civil engineering work materials (water retention sheet, nets for plants and the like), fields of packages and containers (those which are difficult to recycle owing to deposition of soil, food or the like), disposable goods such as convenience goods, sanitary goods, game products and the like. A further increase in future use thereof has been expected from the standpoint of environmental protection.

For instance, applications to electric and electronic articles such as television chassises, personal computer housings ad the like have been studied. When taking the applications to chassises and structural materials of such electric products into consideration, it is considered that a heat resistance of about 80° C. or over is necessary.

In recent years, in order to keep excellent characteristic properties for use as a material to be put into practice, importance has been placed on increase in degree of crystallization.

Especially, with respect to biodegradable polyesters, however, polylactic acid that is typical of the polyesters is a material which is poor in heat resistance and has a glass transition temperature (Tg) of approximately 60° C. When the molded product obtained therefrom is exposed to a temperature exceeding the glass transition temperature, it is softened and deformed and thus, has a problem in practical use.

It will be noted that a heat resistance in practical use means to ensure a stiffness (modulus of elasticity) of about 100 MPa in the vicinity of 80° C.

In order to increase the heat resistance of a biodegradable polyester, mention is made, for example, of a method for adding an inorganic filler having a heat resistance, such as talc, mica or the like. By this, the mechanical properties and the hardness of material can be improved.

However, only addition of inorganic filler to the resin involves a difficulty in ensuring a satisfactory heat resistance in practice.

In the related art, there has been proposed a technique of improving a heat resistance of polylactic acid through thermal treatment during or after molding.

Polylactic acid is a kind of polyester that is able to take a crystal structure, but is a polymer that is unlikely to crystallize. Hence, when polylactic acid is molded according to a method as used in ordinary general-purpose resins. The resulting product becomes amorphous in nature and is eventually poor in mechanical strength and susceptible to thermal deformation.

Nevertheless, when a thermal treatment is performed on the product during or after molding to facilitate crystallization, the heat resistance thereof is improved.

However, the crystallization with a thermal treatment takes a long time and thus, has a problem in a manufacturing practice.

For example, in case where general-purpose resins are used, an injection molding procedure is ordinarily carried out by an about one minute molding cycle. In this connection, it has been considered that for thermally treating a molded product using polylactic acid in such a way that the product is crystallized to such an extent as to ensure mechanical strength sufficient for practical use, too much time is taken in practice.

Where no nucleating agent is added in the crystallization step, a frequency of natural occurrence of crystal nuclei is so low that the crystal size becomes on the order of micrometers. This presents a problem in that a finally obtained molded product becomes clouded and is thus poor in transparency, thus placing limitation on a range of practical use.

As to polyesters capable of taking a crystal structure, one of measures for solving such problems as set out hereinabove and also for facilitating crystallization of the resin is addition of a nucleating agent.

The nucleating agent is one, which becomes primary crystal nuclei and promotes the growth of crystals of a crystalline polymer. Broadly, substances that promote crystallization of a crystalline polymer, or are able to improve a crystallization speed of polymer may be called nucleating agent.

If a nucleating agent is added to a polymer, crystals become more finely thereby obtaining an improved effect of stiffness on a finally obtained resin and an improved effect of transparency.

Since the crystallization speed is improved during the curse of molding, an advantage is obtained in shortening a time required for this step.

Such effects as stated above have been actually confirmed with respect to other types of crystalline polymers.

For instance, polypropylene (which may be hereinafter referred sometimes to as PP) is improved in stiffness and transparency when a nucleating agent is added.

In this instance, a sorbitol substance is applied, for example, as a nucleating agent and it is considered that a three-dimensional network structure of the substance effectively acts on the improvement.

Besides, for a material of a metal salt type, mention is made, for example, aluminium hydroxy-di(t-butylbenzoate), sodium (4-t-butylphenyl)phosphate, sodium methylenebis(2, 4-di-t-butylphenyl)phosphate and the like.

In this connection, however, where a polyester such as polylactic acid is used as a resin, a problem in practical applications is involved with respect to a nucleating agent to be applied.

For instance, where talc is used, its amount should be on the order of several tens of % in order to ensure a satisfactory nucleating effect. However, such an amount becomes too high in content of talc in a resin, with the attendant problem that a finally obtained resin composition is not ensured to obtain mechanical strength thereof that is satisfactory in practice.

The high content of talc in resin causes cloudness to occur and transparency to be degraded, thus leading to a problem in that a range of practical use is narrowly limited.

In the related art, a technique of using sorbitol substances as a nucleating agent has been disclosed (see, for example, Japanese Patent Laid-open No. Hei 10-158369) for application to aliphatic polyesters. It is also disclosed that the substance has an appreciable crystallization effect on polylactic acid.

For promoting crystallization by addition of other types of nucleating agents, a technique of adding at least one member selected from compounds having a melting point of 40 to 300° C. and consisting of aliphatic carboxylic acid amides, aliphatic carboxylic acid salts, aliphatic alcohols and aliphatic carboxylic acid esters has been proposed, for example, as a transparent nucleating agent to be added to aliphatic polyesters (see, for example, Japanese Patent Laid-open No. Hei 9-278991).

Further, there have been proposed techniques including a technique wherein at least one organic compound selected, as a transparent nucleating agent, from those organic compounds having a melting temperature or softening point of 80 to 300° C. and a melting entropy of 10 to 100 cal/K/mol (see, for example, Japanese Patent Laid-open No. Hei 11-5849) and a technique wherein an aliphatic acid ester having a specific type of structure is added, as a clarifying agent, to a polylactic acid resin (see, for example, Japanese Patent Laid-open No. Hei 11-116783).

Especially, with respect to polylactic acid, there have been proposed techniques of providing resin compositions, which are excellent in heat resistance and impact strength, by formulating a certain type of heterocyclic compound in polylactic acid (see Japanese Patent Laid-open Nos. 2004-352872 and 2004-352873).

Phthalic acid hydrazide is exemplified as the heterocyclic compound. In an example wherein this heterocyclic compound and talc are added in combination, crystallinity of polylactic acid is stated as being improved.

In industrial products prepared by use of polyesters, it has been accepted that to ensure durability relative to hydrolysis is important from the standpoint of practical use.

The degree of hydrolysis differs depending on the type and use environment of polyester to be applied. Taking the use period required for individual molded products into account, hydrolysis does not always present a problem involved in practice. Nevertheless, especially, in case where a biodegradable polyester is used, it will become important to ensure service durability against hydrolysis.

More particularly, with a short use period (or with a short time), rapid decomposition is preferred. In this connection, however, with a long use period (or with a long time), hydrolysis has to be suppressed.

For instance, with the case of applications to chassises of electric products, electronic appliances and the like, long-term reliability of about several to ten years is required and thus, mechanical properties such as tensile strength, bending strength, impact resistance and the like have to be maintained at a satisfactory level from a practical standpoint over such a period as mentioned above.

With respect to a technique of improving long-term reliability of degradable polyesters, many proposals have been hitherto made. However, to ensure material reliability simultaneously with an improvement in crystallinity of such a resin as set out hereinabove has never been attained satisfactorily.

SUMMARY

Where none of nucleating agents in the techniques disclosed in the Japanese Patent Laid-open Nos. Hei 10-158369, Hei 9-278991, Hei 11-5849 and Hei 11-116783 are used, neither an effect of promoting crystallization nor an effect of improving durability of the resulting molded product is yet satisfactory in practical use.

With respect to the techniques of the Japanese Patent Laid-open Nos. 2004-352872 and 2004-352873, we evaluated crystallinity by adding phthalic acid hydrazide to polylactic acid, revealing that an improving effect of the additive was small, and a satisfactory service heat resistance and impact strength were not obtained. This will be described hereinafter.

Further, the heterocyclic compound of a specified general formula disclosed in the above Japanese Patent Laid-open Nos. 2004-352872 and 2004-352873 include a large number of substances within the defined range, but little substances are particularly tested, giving no evidence of a satisfactory effect thereof.

Under these circumstances in the art, it is desirable to provide a resin composition in which crystallization of a polyester capable of taking a crystal structure is promoted and mechanical strength is improved and which has a biodegradable function and durability corresponding to a required use time and also a resin molding obtained therefrom.

It is also desirable to provide a resin composition including a polyester capable of taking a crystal structure and a nucleating agent wherein the nucleating agent is made of at least one of uracil and a uracil derivative.

It is further desirable to provide a resin composition including a polyester capable of taking a crystal structure and at least one of uracil and 6-methyluracil as a nucleating agent whereby crystallization of the polyester is remarkably facilitated to ensure excellent stiffness, moldability, heat resistance and durability and also a molding obtained therefrom.

Additional features and advantages are described herein, and will be apparent from, the following Detailed Description.

DETAILED DESCRIPTION

The resin composition and moldings obtained therefrom according to the invention are more particularly described below.

Initially, the resin composition is described. The resin composition is one which includes a polyester capable of taking a crystal structure and a nucleating agent for crystallization selected from uracil, uracil derivatives and mixtures thereof.

The polyester capable of taking a crystal structure is now described.

The polyester may be conventionally known ones provided that they have physical properties enabling a crystal structure.

The term "capable of taking or enabling a crystal structure" means that a crystal structure is formed partly of polyester and it is not always required that all molecular chains be regularly arranged.

Further, it is sufficient for the practice of the invention that even if all molecular chains have no regularity, part of molecular chain segments is orientable.

The polyesters capable of taking a crystal structure include, for example, polyethylene terephthalate. Besides, any known polyesters are usable so far as they have at least one ester bond and are capable of taking a crystal structure.

The polyesters capable of taking a crystal structure should preferably be linear, but may be branched.

The examples of polyesters capable of taking a crystal structure include, aside from those indicated above, biodegradable polyesters that make no use of petroleum resources, are decomposable in a natural field, are obtainable from natural resources such as corn, are able to suppress carbon dioxide from discharging, and contribute to preventing global warming.

For the biodegradable polyesters, mention is made of polyester resins metabolized, for example, with microorganisms. Polylactic acid-based aliphatic polyesters are preferred because of their excellent moldability, heat resistance, impact resistance and the like.

The aliphatic polyesters include, for example, polyoxalic acid, polysuccinic acid, polyhydroxybutyric acid, polydiglycollic acid, polycaprolactone, polydioxanone, polylactic acid-based aliphatic polyesters and the like.

Of these, the polylactic acid-based aliphatic polyesters are preferred. Examples of the polylactic acid-based aliphatic polyesters include polymers or copolymers of oxyacids such as lactic acid, malic acid, glycolic acid and the like, of which hydroxycarboxylic acid-based aliphatic polyesters are preferred and polylactic acid is most preferred.

Various types of biodegradable polyesters can be prepared by hitherto known procedures.

More particularly, mention is made of methods including a lactide method, a polycondensation between a polyhydric alcohol and a polybasic acid, or an intermolecular polycondensation of a hydroxycarboxylic acid having a hydroxyl group and a carboxyl group in the molecule.

More particularly, the polylactic-based aliphatic polyester can be ordinarily prepared according to a method of ring-open polymerization of lactides, which are cyclic diesters, and corresponding lactones, i.e. a so-called lactide method. Aside from the lactide method, mention is made of a direct dehydration condensation method of lactic acid.

For a catalyst used in the preparation of a lactic acid-based aliphatic polyester, mention is made, for example, of compounds of metals such as tin, antimony, zinc, titanium, aluminium and the like. Of these, tin and aluminium catalysts are preferred. More preferably, tin octylate and aluminium cetylacetonate are used.

Of polylactic acids, poly-L-lactic acid obtained through lactide ring-open polymerization is preferred. This is because poly-L-lactic acid is hydrolyzed into L-lactic acid, thereby ensuing a safety to living body.

In the practice of the invention, however, polylactic acid is not always limited to the L body.

Specific examples of a polyester capable of taking a crystal structure include a biodegradable polyester (product name: Lacea) made by Mitsui Chemicals, Inc.

The resin composition of the invention contains, aside from such polyester capable of taking a crystal structure as set out hereinabove, a polyester incapable of taking a crystal structure or other biodegradable resins.

For instance, biodegradable resins include polysaccharide derivatives such as cellulose, starch, dextran, chitin and the like, peptides such as collagen, casein, fibrin, gelatin and the like, polyamino acid, polyvinyl alcohol, polyamides such as nylon 4 and a copolymer of nylon 2 and nylon 6, and polyesters known as not always taking a crystal structure, e.g. polyglycollic acid, polylactic acid, polysuccinic ester, polyoxalate ester, polyhydroxybutyric acid, polydiglycol butylenes, polycaprolactone, polydioxanone and the like. These may be used singly or in combination.

Although the biodegradable polyesters may be ones which are prepared by any known procedures, commercially available products may also be used.

For instance, mention is made of those products commercially available under the commercial names of Lacty made by Toyota Motor Corporation, Lacea made by Mitsui Chemicals, Inc., Nature Works made by Cargill Dow Polymer LLC Inc., and the like.

The biodegradable polyesters, which are one of components of the resin composition of the invention, are those indicated hereinabove and may be used singly or in combination.

Where two or more biodegradable resins are contained, these resins may be mutually in the form of a copolymer or may be in a mixed form.

The resin composition of the invention may further include resins other than biodegradable polyesters in amounts within a range not impeding the purposes of the invention.

Such resins include, for example, hydrocarbon resins such as polyethylene, polypropylene, polystyrene, polubutadiene and the like, polar vinyl plastics such as polyvinyl chloride, polyvinyl acetate, polyvinylidene chloride, ethylene and vinyl acetate copolymers, polymethyl methacrylate and the like, linear polymers polyacetals, polyamides, polycarbonates, polyethylene terephthalate, polybutylene terephthalate and the like, cellulose plastics such as cellulose acetate, cellulose butyrate and the like, thermoplastic elastomers such as styrene/butadiene elastomers, polyolefin elastomers, urethane elastomers, polyester elastomers, polyamide elastomers, polyvinyl chloride elastomers and the like, formaldehyde resins, phenolic resins, amino resins, unsaturated polyester resins, diallyl phthalate resins, alkyd resins, epoxy resins, urethane resins, silicon resins, polylactic acid whose decomposition rate is reduced, polybutylene succinate, and the like.

Next, the nucleating agents used to promote crystallization a polyester capable of taking a crystal structure is described.

In the practice of the invention, uracil of the following formula (1) and uracil derivatives are used as a nucleating agent. Of the uracil derivatives, 6-methyluracil of the following formula (2) is preferred.

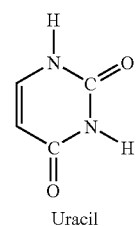

Uracil (1)

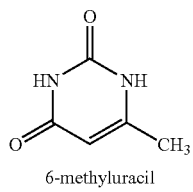

(2)

6-methyluracil

Uracil is a known substance as a constituent element of RNA of a living body. With respect to the safety of uracil to a living body, the results of inspection of LD50 reveal that the LD 50 value is at several grams/kg and thus, is a substance that is excellent in safety to a living body.

Uracil has two hydrogen atoms at the 6 and 5 positions.

The individual hydrogen atoms can be substituted with a substituent group or functional group and a variety of uracil derivatives may be prepared.

The carbon atoms at the 6 and 5 positions of uracil are joined through a double bond, and 5,6-dihydrouracil that are obtained by hydrogenation at the positions may also be used as a uracil derivative.

5,6-Diuracil has four hydrogen atoms in total at the 6 and 5 positions, and the individual hydrogen atoms may be replaced by a substituent group or functional group, thereby providing different types of uracil derivatives.

The substitution of either or both of the carbon atoms at the 6 and 5 positions with other element such as nitrogen or the like enables the formation of uracil derivatives.

Further, the carbonyl group ($>C=O$) may be replaced by a thioketo group ($>C=S$) or $>S(=O)_2$, thereby providing uracil derivatives.

Uracil and uracil derivatives may take a structure of so-called keto-enol tautomerism. These tautomers are also used as a uracil derivative.

Specific examples of substituent groups of uracil derivatives include, for example, a halogen atom such as fluorine, chlorine, bromine or iodine, a nitro group, a cyano group, a hydroxy group, a thiole group, a sulfo group, a sulfino group, a mercapto group, a phosphono group, a linear or branched alkyl group such as a methyl group, an ethyl group, an isopropyl group, an n-propyl group, an n-butyl group, an isobutyl group, a secondary butyl group, a tertiary butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group or the like, a hydroxyalkyl group such as a hydroxymethyl group, a hydroxyethyl group, a 1-hydroxyisopropyl group, a 1-hydroxy-n-propyl group, a 2-hydroxy-n-butyl group, a 1-hydroxy-isobutyl group or the like, a halogenoalkyl group such as chloromethyl, dichloromethyl, trichloromethyl, fluoromethyl, difluoromethyl, trifluoromethyl, 2-bromoethyl, 2,2,2-trifluoroethyl, pentafluoroethyl, 3,3,3-trifluoropropyl, 4,4,4-trifluorobutyl 5,5,5-trifluoropentyl, 6,6,6-trifluorohexyl or the like, a cycloalkyl group such as cyclopropyl, cyclobutyl, cyclopentyl, cyclohexyl, cycloheptyl or the like, an alkenyl group such as 2-cyclopentenyl, 2-cyclohexenyl, 2-cyclopentenylmethyl, 2-cyclohexenylmethyl or the like, an alkynyl group such as ethynyl, 1-propynyl, 2-propynyl, 1-butynyl, 2-pentynyl, 3-hexynyl or the like, an oxo group, a thioxo group, an amidino group, an imino group, an alkylenedioxy group such as methylenedioxy, ethylenedioxy or the like, an aromatic monocyclic or aromatic condensed ring hydrocarbon group such as phenyl, biphenyl or the like, an aromatic hydrocarbon group including a crosslinked ring hydrocarbon group such as a 1-adamantyl group, a 2-norbonanyl group or the like, an alkoxy group such as methoxy, ethoxy, propoxy, isopropoxy, butoxy, isobutoxy, secondary butoxy, tertiary butoxy, pentyoxy, neopentyloxy, hexyloxy or the like, an alkylthio group such as methylthio, ethylthio, propylthio, isopropylthio, butylthio, isobutylthio, pentylthio, hexylthio or the like, a carboxyl group, an alkanoyl group such as formyl, acetyl, propionyl, butyryl, isobutyryl or the like, an alkanoyloxy group including an alkyl-carbonyloxy group such as formyloxy, acetyloxy, propionyloxy, butyryloxy, isobutyryloxy or the like, an alkoxycarbonyl group such as methoxycarbonyl, ethoxycarbonyl, propoxycarbonyl, butoxycarbonyl or the like, an aralkyloxycarbonyl group such as benzyloxycarbonyl or the like, a thiocarbamoyl group, an alkylsulfinyl group such as methylsulfinyl, ethylsulfinyl or the like, an akylsulfonyl group such as methylsulfonyl, ethylsulfonyl, butylsulfonyl or the like, a sulfamoyl group, a monoalkylsulfamoyl group such as methylsulfamoyl, ethylsulfamoyl or the like, a dialkylsulfamoyl group such as dimethylsulfamoyl, diethylsulfamoyl or the like, an arylsuflamoyl group such as phenylsulfamoyl, naphthylsulfamoyl or the like, an aryl group such as phenyl, naphthyl or the like, an aryloxy group such as phenyloxy, naphthyloxy or the like, an arylsulfinyl group such as phenylsulfinyl, naphthylsulfinyl or the like, an arylsulfonyl group such as phenylsulfonyl, naphthylsulfonyl or the like, an arylcarbonyl group such as benzoyl, naphthoyl or the like, an arylcarbonyoxy group such as benzoyloxy, naphthoyloxy or the like, an alkylcarbonylamino, which may be halogenated, such as acetylamino, trifluoroacetylamino or the like, a carbamoyl group, which may have a substituent group, such as a group represented by the chemical formula, $CONR1R2$ wherein R1 and R2 independently represent a hydrocarbon group which may has a substituent group, or a heterocyclic group which may have a substituent group provided that R1 and R2 may join to form a ring along with the adjacent nitrogen atom, an amino group, which may have a substituent group, such as amino, alkylamino, tetrahydropyrrole, piperazine, piperizine, morpholine, thiomorpholine, pyrrole, imidazole or the like, a ureido group such as a group of the chemical formula, $—NHCONR3R4$ wherein R3 and R4 independently represent a hydrogen atom, a hydrocarbon group which may have a substituent group, or a heterocyclic group which may have a substituent group provided that R3 and R4 may join to form a ring along with the adjacent nitrogen atom, a carboxyamido group which may have a substituent group such as a group of the chemical formula, $—NR5COR6$ wherein R5 and R6 independently represent a hydrogen atom, a hydrocarbon group which may have a substituent group, or a heterocyclic group which may have a substituent group provided that R5 and R6 may join to form a ring along with the adjacent nitrogen atom, a sulfonamido group which may have a substituent group such as a group of the chemical formula, $—NR7SO_2R8$ wherein R7 and R8 independently represent a hydrogen atom, a hydrocarbon group which may have a substituent group, or a heterocyclic group which may have a substituent group provided that R7 and R8 may join to form a ring along with the adjacent nitrogen atom, a hydroxy group or mercapto group which may have a substituent group, a heterocyclic group which may have a substituent group, i.e. an aromatic heterocyclic group containing at least one of one to three types of heteroatoms selected from oxygen, sulfur and nitrogen atoms as an atom (ring atom) constituting the cyclic compound, such as pyridyl, furyl, thiazolyl, a saturated or unsaturated aliphatic heterocyclic ring group or the like, or those groups indicated above which are substituted to an extent as chemically allowable as possible.

Aside from 6-methyluracil, a diversity of uracil derivatives may be used in the practice of the invention.

For instance, when the hydrogen at the 5 position is replaced with a methyl group, 5-methyluracil is obtained and is usually called thymine of the following formula (3).

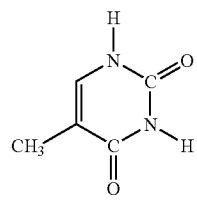

Thymine
(3)

Besides, there are mentioned various derivatives including 6-azathymine of the following formula (4), 6-azauracil of the following formula (5), 5-chlorouracil of the following formula (6), 6-benzyl-2-thiouracil of the following formula (7), 5-cyanouracil of the following formula (8), ethyl 2-thiouracil-5-carboxylate of the following formula (9), 5-ethyluracil of the following formula (10), 5,6-dihydro-6-methyluracil of the following formula (11), 5-(hydroxymethyl)uracil of the following formula (12), 5-iodouracil of the following formula (13), 5-methyl-2-thiouracil of the following formula (14), 5-nitrouracil of the following formula (15), 5-(trifluoromethyl)uracil of the following formula (16), 2-thiouracil of the following formula (17), 5-flurouracil of the following formula (17) and the like.

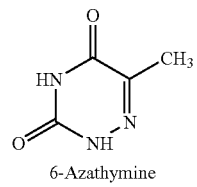

6-Azathymine
(4)

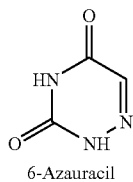

6-Azauracil
(5)

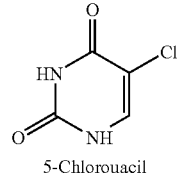

5-Chlorouacil
(6)

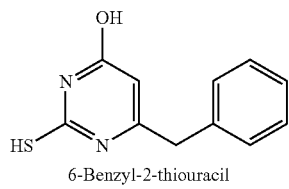

6-Benzyl-2-thiouracil
(7)

-continued

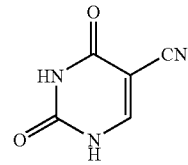

5-Cyanouracil
(8)

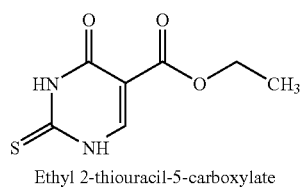

Ethyl 2-thiouracil-5-carboxylate
(9)

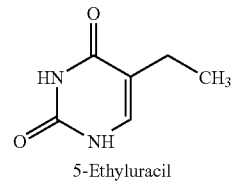

5-Ethyluracil
(10)

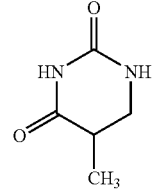

5,6-Dihydro-6methyluracil
(11)

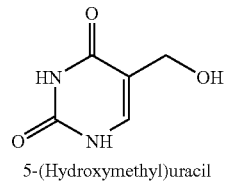

5-(Hydroxymethyl)uracil
(12)

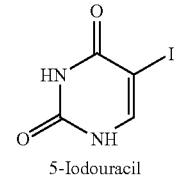

5-Iodouracil
(13)

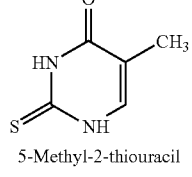

5-Methyl-2-thiouracil
(14)

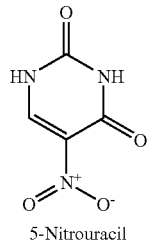

5-Nitrouracil
(15)

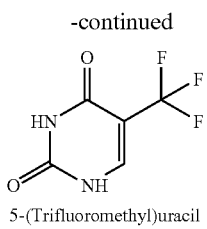
5-(Trifluoromethyl)uracil (16)

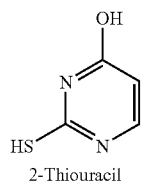
2-Thiouracil (17)

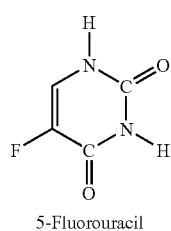
5-Fluorouracil (18)

For uracil derivatives other than those indicated above, 2-thiouracil is mentioned as being preferred. It will be noted that among these uracil derivatives, 6-methyluracil is preferred for use in the resin composition of the invention.

With respect to the safety of 6-methyluracil to a living body, LD50 is at 64.5 g/kg and thus, this substance is very excellent in the safety.

Uracil and 6-methyluracil may be ones, which are prepared by any of known procedures, or are commercially available substances, respectively.

Commercially available uracil may include, for example, products commercially sold from Kyowa Hakko Kogyo Co., Ltd., and Asahi Kasei Finechem Co., Ltd. Commercially sold 6-methyluracil includes ones sold, for example, from Wako Pure Chemical Industries, Ltd., and Tokyo Chemical Industry Co., Ltd.

Uracil and 6-methyluracil used as a nucleating agent are each in the form of powder. The powdery particles should preferably be crystalline in nature.

The crystal particles of uracil and 6-methyluracil should preferably have a size of 10 μm or below, more preferably 1 μm or below.

The amount of the nucleating agent in the resin composition is preferably within a range of 0.001 part by weight to 10 parts by weight, more preferably 0.01 part by weigh to 1 part by weight, per 100 parts by weight of a polyester capable of taking a crystal structure.

The size and content of the crystal particles of a nucleating agent are interdependently influenced and thus, it is important to determine the particle size and content in such a way as to effectively promote crystallization of a polyester.

Uracil and derivatives thereof can be formed as particles that are finer than those of talc hitherto used as a nucleating agent, thus being advantageous in that the amount thereof can be reduced over the related art case.

The optimum ranges of the content and particle size of a nucleating compound relative to a polyester capable of taking a crystal structure are now described.

Assuming that there are two resin compositions having substantially the same amount of a nucleating agent contained therein, respectively, a smaller particle size results in a better effect of crystallization. This is because a smaller particle size leads to a larger number of particles of a nucleating agent in the resin composition, thereby increasing a number of nuclei and rendering the resulting crystals finer.

In this case, when the particle size of a nucleating agent is reduced to half, the volume of one particle of the agent becomes ⅛. The number of particles becomes eight times as large. More particularly, if the particle size is reduced to half, the content can be reduced to ⅛, with which a similar effect can be expected.

It will be noted that in case where a nucleating agent in the form of particles having the same size is contained in such two resin compositions, a larger amount of the agent, of course, leads to a better effect or results.

Given the fact stated above, the optimum ranges of the particle size and content of a nucleating agent are described in detail. It is to be noted that a simple model is taken herein along with the following assumptions.

(1) For simplicity of calculation, the densities of a polymer capable of taking a crystal structure and a nucleating agent are substantially at the same level.

(2) The particles of a nucleating agent are fully free of coagulation and are completely uniformly dispersed in a resin composition. That is, the nucleating agent exists in the composition in the form of cubic lattices.

(3) The crystals of a polymer capable of taking a crystal structure are in a cubic form.

(4) Likewise, the particles of a nucleating agent are also in a cubic form.

(5) One resin crystal is created from one particle of a nucleating agent.

(6) Polylactic acid is specified herein as a polymer capable of taking a crystal structure.

Based on such assumptions as set out above, a crystal size of polylactic acid can be obtained through volume calculation from a content (%) of a nucleating agent and a particle size of the agent.

The results are shown in Table 1 below.

TABLE 1

| Amount of nucleating | Particle Size of Nucleating Agent (μm) | | | | | | |
|---|---|---|---|---|---|---|---|
| agent | 0.01 | 0.05 | 0.1 | 0.5 | 1 | 5 | 10 |
| 0.001% | 0.46 | 2.3 | 4.6 | 23 | 46 | 232 | 464 |
| 0.01% | 0.22 | 1.1 | 1.3 | 6 | 13 | 108 | 215 |
| 0.1% | 0.10 | 0.5 | 1.0 | 5 | 10 | 50 | 100 |
| 1.0% | 0.05 | 0.2 | 0.5 | 2 | 5 | 23 | 46 |
| 10% | 0.02 | 0.1 | 0.2 | 1 | 2 | 11 | 22 |

With the case where a nucleating agent is contained in polylactic acid used as a polymer capable of taking a crystal structure, if a crystal size (one side) of polylactic acid is taken, for example, as X μm, the volume of the crystal of polylactic acid including a volume of a nucleating agent existing at the center thereof becomes $X^3$ μm$^3$.

On the other hand, when the size of a nucleating agent (a length of one side) is taken as 0.05 μm and the content of the nucleating agent is taken as 0.5% (0.005 as a ratio), $X^3 \times 0.005 = 0.05^3$, from which the crystal size of polylactic acid is calculated such that X=0.29 μm.

Where a nucleating agent is actually incorporated in a resin molding, the particle size and content of a nucleating agent should be properly selected so as to obtain a desired crystal size depending on the purpose while referring to such a volume calculation as set forth above.

For example, when a polyester capable of taking a crystal structure is polylactic acid, the case where a crystallization temperature is taken as 120° C. and a crystallization time is within about 1 minute is checked below.

It was confirmed that the growing rate (dr/dt) of a radius (r) of spherocrystals of polylactic acid at 120° C. was at about 2 μm/minute.

When the growing rate in radius of the spherocrystal is assumed to be substantially the same as the growing rate of the above-assumed cubic crystal, a time required for crystallization can be calculated. The results are shown in Table 2 below.

TABLE 2

| Amount of Nucleating Agent | Particle Size of Nucleating Agent [μm] | | | | | | |
|---|---|---|---|---|---|---|---|
| | 0.01 | 0.05 | 0.10 | 0.5 | 1 | 5 | 10 |
| 0.001% | 7.0 | 35 | 70 | 348 | 696 | 3481 | 6962 |
| 0.01% | 3.2 | 16 | 19 | 94 | 189 | 1616 | 3232 |
| 0.1% | 1.5 | 8 | 15 | 75 | 150 | 750 | 1500 |
| 1.0% | 0.7 | 3 | 7 | 35 | 70 | 348 | 696 |
| 10% | 0.3 | 2 | 3 | 16 | 32 | 162 | 323 |

For instance, when the particle size of a nucleating agent is 1 μm and the amount is 1%, the crystallization time is calculated to be at 70 seconds.

It was confirmed that the resin composition should preferably include 0.001 part by weight to 10 parts by weight per 100 parts by weight of a polyester capable of taking a crystal structure.

If the content of a nucleating agent is less than 0.001 part by weight per 100 parts by weight of the polyester, a difficulty is involved in attaining an effect of promoting crystallization of the polyester by incorporation of the nucleating agent because of too small a content of the nucleating agent.

On the other hand, if the content of the nucleating agent is larger than 50 parts by weight per 100 parts by weight of the polyester, there arises a problem in that mechanical characteristics, such as stiffness, of a finally obtained resin composition deteriorate because of too large a content.

In this way, it was confirmed that when the nucleating agent is added within a range of 0.001 part by weight to 10 parts by weight per 100 parts by weight of a polyester, crystallization of the polyester is facilitated and mechanical characteristics of the resin composition are prevented from deteriorating.

For instance, where crystallization is performed by formulating 10 parts by weight of a nucleating agent having a particle size of 10 μm under temperature conditions of 120° C., the time required for the crystallization is about 5 minutes according to Table 2.

More particularly, when polylactic acid is crystallized in a mold set at a mold temperature of about 120° C. in an injection molding machine, it is assessed that a time required for the crystallization is about 5 minutes.

The resin stays in a cylinder of the molding machine in a hot, molten state with the possibility that polylactic acid is thermally decomposed, under which the residence time within the mold is set within 5 minutes. Accordingly, the formulation of 10 parts by weight of the nucleating agent having a particle size of 10 μm in polylactic acid is a critical condition of satisfying an optimum range of the content of the nucleating agent.

If a size of particles of a nucleating agent is too small, coagulation occurs. This eventually leads to poor dispersion of the particles in a polyester wherein the particles are locally distributed, with the possibility of causing a substantial particle size to be increased.

In view of the above fact, the particle size of a nucleating agent should preferably be at about 0.5 μm or below, by which coagulation is suppressed and good dispersability in the resin is ensured.

Where polylactic acid is crystallized by use of a nucleating agent having a particle size of 0.5 μm, the results of Table 2 reveal that for the purpose of keeping a time required for the crystallization at about 5 minutes, the lower limit of the content of the nucleating agent is 0.001 part by weight per 100 parts by weight of polylactic acid.

It will be noted that even if a particle size is smaller than 0.5 μm, a degree of coagulation becomes lessened depending on the type of nucleating agent. In this case, the content may be further reduced. Alternatively, with the case of using a nucleating agent having a smaller size, the dispersability of the nucleating agent in a resin is improved by use of some type of coagulant to reduce a content of the agent.

In order to expand practical versatility of the resin composition, it is preferred to enhance transparency.

To this end, spherocrystals of a polyester should be formed as being smaller than a wavelength of visible light.

This eventually requires that the size of nucleating particles in a polyester be smaller than the visible light wavelength.

When the wavelength of visible light is taken as 1 μm, it will be seen that at least within the ranges of the particle size and content of the nucleating agent set out in Table 1, the particle size has to be 0.5 μm or below and the amount of the agent has to be 10% or over.

In order to ensure satisfactory transparency of the resin composition, it is favorable that the particle size of the nucleating agent is 0.15 μm or below and the content there is 1% or over. Preferably, the particle size is 0.5 μm or below and the content is 1% or over.

More preferably, the particle size is 0.01 μm or below and the content is 0.1% or over.

It will be noted that the term "transparency" used herein means not only a complete transparency such as of so-called glass or amorphous polymers such as polystyrene, but also a transparency in a slightly clouded state. Such a transparency in a slightly clouded state is judged as having a service transparency.

A haze is known as representing a degree of cloudness. The measuring method is described in JIS K7105 and the like.

More particularly, transparency is expressed in terms of a haze value of a 1 mm thick sheet formed of a resin. A smaller haze value indicates a higher transparency.

For instance, a known resin composition obtained by adding a sorbitol substance to polypropylene is high in transparency, and a container obtained from the polypropylene resin composition has such transparency as to permit contents, such as a food and the like, in the container to be visually observed. In this case, the haze value is at about 30%.

It should be noted that with the resin composition of the invention, when a particle size of a nucleating agent added to a polyester capable of taking a crystal structure is optimized, the haze value can be reduced to improve transparency.

It is actually difficult to provide particles of a nucleating agent which are exactly uniform or constant in size. More particularly, the particles of a nucleating agent has a given size distribution and contains coarse particles with large sizes.

If a particle whose size is greater than a light wavelength is contained in a polymer as having a different refractive index, such a particle serves as an optically foreign matter relative to the polymer, thus lowering transparency.

It is preferred that the refractive indexes of a polyester capable of taking a crystal structure and a nucleating agent are close to each other. More particularly, when a difference in refractive index is within about ±0.05, the particles of the nucleating agent are avoided from becoming an optically foreign mater relative to the polyester.

Where a refractive index of a polyester capable of taking a crystal structure greatly differs from a refractive index of a nucleating agent, excellent transparency is ensured by rendering the nucleating agent small in size. For instance, when a nucleating agent is broken into pieces having a size of several tens of nanometers, visible light is able to pass therethrough, thus ensuring excellent transparency.

As stated hereinabove, optimum ranges of the content and particle size of a nucleating agent are calculated based on several assumptions. In practice, there may occur coagulation of nucleating particles, the particles may not be substantially uniformly dispersed in a polymer, and the particles may have some size distribution.

In view of the above, it may be considered necessary to use a larger amount of a nucleating agent relative to a polyester. Nevertheless, when taking the lowering of mechanical characteristics of a resin composition into account, the content of a nucleating agent should preferably be at about 1%.

Accordingly, when the amount of a nucleating agent in the resin composition is within a range of 0.01 part by weight to 1 part by weight per 100 parts by weight of a polyester, a further enhanced effect can be expected.

The nucleating agent used in the invention may be processed to have such a desired particle size as set out hereinabove by any known procedures.

For instance, either a mechanical pulverization method or a chemical method may be used.

The mechanical pulverization method includes a ball milling technique, a salt milling technique, a freeze pulverization technique or the like. Alternatively, pulverization techniques called jet milling and air hammering may also be used.

These techniques are ones wherein particles are collided from two directions along with an air stream.

The chemical method includes recrystallization, spray drying and the like.

The nucleating agent made of such a cyclic compound as indicated hereinbefore is dissolved in a given solvent therefor and recrystallized to obtain fine particles.

More particularly, using a temperature difference in solubility, fine particles are obtained by cooling a hot saturated solution of a cyclic compound or evaporating a solvent for concentration, or by adding another type of solvent to the solution to reduce a solubility thereof.

Alternatively, there may be used spray drying wherein a solution dissolving a cyclic compound therein is sprayed to evaporate the solvent to obtain fine particles.

Besides any hitherto known techniques of preparing fine particles may be used.

Smaller particles of a nucleating agent are more liable to coagulate.

At a stage prior to addition to a polymer capable of taking a crystal structure, it is of no problem in the practice of the invention whether the particles coagulate, are small in degree of coagulation, or do not coagulate. However, when a resin composition is prepared by addition of the particles of a nucleating gent to the polymer, it is not favorable that the particles of a nucleating agent coagulate in a polymer as stated hereinbefore and thus, should preferably be dispersed uniformly. In order attain such a uniformly dispersed state, it is desirable to suppress the particles from coagulation at a stage prior to the addition to a polymer.

For the suppression of coagulation, hitherto known techniques may be used.

For instance, an anticoagulant is added to a nucleating agent prior to pulverization into fine particles or during the course of the pulverization, or after the pulverization.

The anticoagulants may be those known in the art and include, for example, low molecular weight polyethylene, nonionic surface active agents and the like.

Although uniform dispersion of a nucleating agent in a polyester may be achieved only through the addition of an anticoagulant, it is also important how to mix a polymer and the nucleating agent.

The manner of mixing will be described hereinafter.

When the resin composition of the invention is molded into a product and the product is discarded after service use within a short period, a polyester used should preferably be susceptible to biodegradation.

For instance, there has been recently proposed the use of a degradable polymer, or a biodegradable polyester, in a field of utility allowing a short service period such as of shopping bags.

To this end, studies and developments have been made on promoted decomposition of polymers. With polyesters, substances facilitating hydrolysis may be added in some case.

On the other hand, where a product obtained by molding the resin composition of the invention has a relatively long service period, or where the product is a chassis of an electric product, it is desirable that the resin do not undergo degradation considerably during the service period.

In order to achieve such a purpose, it is necessary to add a substance capable of suppressing the degradation, which is so-called hydrolysis inhibitor.

In this way, the long-term reliability in the use of molded products can be enhanced.

Although hydrolysis inhibitors are not critical in type provided that they are able to suppress hydrolysis of polyesters, particularly biodegradable polyesters, there may be mentioned compounds having reactivity with active hydrogen of the biodegradable resins.

When such a compound as mentioned above is added for use as a hydrolysis inhibitor, an amount of active hydrogen in the biodegradable resin of the resin composition is reduced so that the polymer chains constituting the biodegradable resin can be appreciably suppressed from being catalytically hydrolyzed with the active hydrogen.

The term "active hydrogen" means hydrogen existing in the bond between oxygen or nitrogen and hydrogen such as a N—H bond or an O—H bond. This active hydrogen is more reactive than hydrogen in the bond between carbon and hydrogen (C—H bond).

More particularly, the hydrogen atom such as in a carboxyl group (—COOH), a hydroxyl group (—OH), an amino group (—NH$_2$), an amido bond (—NHCO—) or the like in a biodegradable resin is active hydrogen.

For a hydrolysis inhibitor, mention is made, for example, of a carbodiimide compound, an isocyanate compound, an oxazoline compound and the like, which may be used singly or in combination of two or more.

Of these, a carbodiimide compound is preferred because this compound is readily melted in and mixed with a biodegradable resin and a hydrolysis inhibiting effect is attained by addition of a small amount thereof.

The carbodiimide compound acting as a hydrolysis inhibitor is one having one or more carbodiimido group in the molecule and includes a polycarbodiimide compound.

The monocarbodiimide compounds encompassed within a scope of the carbodiimide compound include, for example, dicyclohexylcarbodiimide, diisopropylcarbodiimide, dimethylcarbodiimide, diisobutylcarbodiimide, dioctylcarbodiimide, diphenylcarbodiimide, nahthylcarbodiimide and the like, of which dicyclohexylcarbodiimide and diisopropylcarbodiimide that are industrially, readily available are preferred.

Examples of the isocyanate compound serving as a hydrolysis inhibitor include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate and the like.

Examples of the oxazoline compound serving as a hydrolysis inhibitor include 2,2'-o-phenylene bis(2-oxazoline), 2,2'-m-phenylene bis(2-oxazoline), 2,2'-p-phenylene bis(2-oxazoline), 2,2'-p-phenylene bis(4-methyl-2-oxazoline), 2,2'-m-phenylene bis(4-methyl-2-oxazoline), 2,2'-p-phenylene bis(4,4'-dimethyl-2-oxazoline), 2,2'-m-phenylene bis(4,4'-dimethyl-2-oxazoline), 2,2'-ethylene bis(2-oxazoline), 2,2'-tetramethylene bis(2-oxazoline), 2,2'-hexamethylene bis(2-oxazoline), 2,2'-octamethylene bis(2-oxazoline), 2,2'-ethylene bis(4-methyl-2-oxazoline), 2,2'-diphenylene bis(2-oxazoline) and the like.

These hydrolysis inhibitors can be readily prepared according to known procedures, and commercially sold products may also be used. Commercial products include, for example, a carbodiimide (commercial name: Carbodilite) made by Nisshinbo Industries, Inc.

Since the biodegradation rate of a resin composition can be appropriately controlled depending on the kind and amount of a hydrolysis inhibitor, the kind and amount of the inhibitor should be determined depending on the type of intended product.

More particularly, the amount of a hydrolysis inhibitor is at 5 wt % or below, preferably 1 wt % or below, based on the total weight of a resin composition.

Inorganic fillers may be added to the resin composition of the invention so as to improve a heat resistance and stiffness.

The inorganic fillers used may be any known materials including, for example, talc, alumina, silica, magnesia, mica, kaolin and the like. These materials may be used singly or in combination.

It has been confirmed that where polylactic acid is applied as a polyester capable of taking a crystal structure, talc used as an inorganic filler may be appropriately employed in combination with a nucleating agent of uracil or 6-methyluracil to provide an effect of promoting crystallization of the polymer without involving a mutual adverse influence on the polymer. In this sense, talc is a preferred filler.

The amount of an inorganic filler should preferably be within a range of 1 part by weight to 50 parts by weight per 100 parts by weight of a polyester capable of taking a crystal structure.

If the amount of an inorganic filler is smaller than 1 part by weight per 100 parts by weight of the polyester, an effect of enhancing a heat resistance and stiffness of the resulting resin composition is not satisfactorily obtained due to too small an amount of the filler.

On the other hand, when the amount of the filler is larger than 50 parts by weight per 100 parts by weight of the polyester, there is the possibility that a finally obtained resin composition is embrittled owing to too large an amount of the filler.

Accordingly, the inorganic filler added in an amount of 1 part by weight to 50 parts by weight per 100 parts by weight of the polyester ensures a resin composition whose heat resistance and stiffness are enhanced and avoidance of the resin composition from being embrittled.

The resin composition of the invention may further include various types of additives in amounts not significantly impeding the promotion of crystallization with such a nucleating agent as set out hereinbefore. Examples of the additives include an antioxidant, a light stabilizer, a UV absorber, a pigment, a colorant, an antistatic agent, a release agent, a flavor, a lubricant, a flame retardant, a filler, and an antibacterial agent, and the like.

The resin composition of the invention can be prepared by mixing a polyester capable of taking a crystal structure, a nucleating agent and, optionally additives, all set out hereinbefore.

For the preparation, there is mentioned, for example, a method wherein a nucleating agent, an inorganic filler, a hydrolysis inhibitor and additives are mixed with a starting polyester, followed by kneading under molten conditions, for example, by use of an extruder.

Alternatively, a solution method may be used for this purpose.

The solution method is one wherein an arbitrary solvent capable of dispersing or dissolving individual ingredients is used, and starting ingredients and the solvent are well agitated to provide a slurry, followed by removing the solvent by a known procedure such as drying or the like. It will be noted that for the preparation of a resin composition, limitation is not placed on these methods mentioned above and other known procedures may be optionally used.

In the resin composition of the invention, it is important to substantially uniformly, finely disperse the particles of a compound serving as a nucleating agent in a polyester capable of taking a crystal structure.

For the substantially uniform dispersion, techniques in the related art may be applicable. For example, there are mentioned methods including, a method wherein a pigment is dispersed in a resin for coloration, a method using a three roll mill, a method wherein a simple heating and kneading cycle is repeated plurally.

More particularly, pellets made of a polyester capable of taking a crystal structure, e.g. polylactic acid, is dried, for example at 60° C. for five hours under reduced pressure. Next, the pellets of the polyester and a compound serving as a nucleating agent are, respectively, weighed in given amounts and mixed such as in a mixer. Thereafter, the mixture is kneaded under heating conditions by use, for example, of a biaxial kneader or the like, after which the resulting mixture is cut into pellets and dried with hot air.

In this manner, there can be obtained a resin composition wherein the compound serving as a nucleating agent are substantially uniformly dispersed in the polyester.

It will be noted that although the pellets made of the polyester such as polylactic acid has been stated as being dried under reduced pressure, they may be dried with hot air, for example, at a temperature of 80° C. for 12 hours. Nevertheless, the drying under reduced pressure is preferred.

The resin composition is subjected to a heating step and a packing and retaining step in a mold to obtain a resin molding.

The heating step carried out to make a resin molding from the resin composition may not be limited to a specific one so far as the resin composition can be heated and molten. A heating means may include any known means using, for example, a heater.

The heating temperature is usually at a level higher by about 10° C. to 50° C., preferably by about 15° C. to 30° C., than a melting point of the resin composition.

The melting point is a value determined by use of a Differential Scanning Calorimeter (DSC).

More particularly, with the case where a melting point is determined for a resin composition using, for example, polylactic acid as a polymer capable of taking a crystal structure, 3 to 4 mg of the resin composition is cut off and placed in an aluminium pan. This sample is once heated up to 200° C. and cooled down to 0° C. at a rate of 50° C./minute, followed by DSC measurement while raising the temperature at a rate of 20° C./minute to determine a melting point as a temperature corresponding to an endothermic peak, for example, in the vicinity of 160° C.

The step of packing and retaining in a mold may be any known step wherein a melt of the resin composition obtained after the heating step can be packed and retained in a mold.

The mold may be one which is kept at a temperature within a range of about −50° C. to +30° C. relative to a crystallization temperature of a polymer in the resin composition. The mold is not critical with respect to the type thereof.

The heat retaining means for the mold may be any known means and includes, for example, a means using a heater and a thermostat.

For the manufacture of resin moldings from the resin composition, the heat-retaining temperature of a mold is within a range of about −50° C. to +30° C. relative to a crystallization temperature of the resin composition and preferably ranges from about 90° C. to 140° C. from the standpoint of the crystallization of the resin composition and the preventing of thermal deformation of resin moldings.

The crystallization temperature can be determined according to DSC measurement as stated hereinabove.

More particularly, with the case where a crystallization temperature is determined for a resin composition using, for example, polylactic acid as a polymer capable of taking a crystal structure, 3 to 4 mg of the resin composition is cut off and placed in an aluminium pan. This sample is once heated up to 200° C., followed by DSC measurement while cooling down to 0° C. at a rate of 20° C./minute to determine a crystallization temperature corresponding to an endothermic peak, for example, in the vicinity of 120° C.

If the resin composition is constituted of a plurality of polymers, a plurality of endothermic peaks and a plurality of exothermic peaks derived, respectively, therefrom may be measured in the DSC measurement.

In this case, an endothermic peak temperature derived from a main polymer (i.e. a polymer of the highest content) selected among the plural polymers is taken as the melting point of the resin composition. Likewise, an exothermic peak derived from the main polymer is taken as the crystallization temperature.

In the packing and retaining step, a melt of a resin composition is packed in a mold, at which the melt of the resin composition has a temperature higher than a heat-retention temperature and comes close to the heat-retention temperature with a lapse of time.

The packing means is any means provided that a melt of a resin composition can be packed in a mold.

For instance, means for injecting a melt into a mold by application of a pressure may be mentioned.

The cooling means may be any means so far as a melt of a resin composition can be cooled and any known means is applicable therefor.

The cooling is feasible by any known procedures so far as a melt of a resin composition can be cooled down, and a cooling time is not critical. Either rapid or gradual cooling may be used.

In the cooling step, a means for allowing to cool, or a quenching means using water, ice, iced water, dry ice, liquid nitrogen or the like may be used.

From the standpoint of crystallization and productivity of a resin composition, the packing and retaining time is preferably within a range of about 10 seconds to four minutes, more preferably about 20 seconds to one minute.

Immediately after crystallization of the resin composition is accomplished to saturation, the resulting molding is removed from the mold.

Alternatively, a molding may be removed on the way of crystallization.

This is because the modulus of elasticity is improved when crystallization proceeds to an extent, so that a molding of the resin composition can be removed from a mold without deformation thereof. The molding obtained after the removal undergoes further crystallization by the action of residual heat. In this way, crystallization is substantially completed to saturation before cooling down at room temperature.

After the packing and retaining step, the temperature of the molding immediately after removal of the molding from a mold should preferably be as low as possible. For lowering the temperature of a molding, for example, cold air is blown against the molding when the mold is opened. To lower the temperature of the molding in this manner leads to the molding being prevented form deforming.

For the manufacture of resin moldings from the resin composition, many known molding methods are usable including a cast molding method, a compression molding method, a transfer molding method, a injection molding method, an extrusion molding method, an inflation method, a calendering method, a blowing method, a vacuum molding method, a laminate molding method, a spray-up method, a foaming method, a matched die molding method, an SMC method and the like.

Such a molding method as mentioned above is favorably feasible by use of a known molding machine such as an injection molding machine.

Next, the method of manufacturing resin moldings from the resin composition is more particularly described.

Initially, a resin composition is heated at a temperature higher by about +15° C. to +30° C. than a melting point thereof by use, for example, of a known injection molding machine. Next, a melt of the resin composition is injected in a mold which is kept at a temperature within a range of about −50° C. to +30° C. relative to a crystallization temperature of a polymer in the resin composition.

After the injection, a compression pressure is continually applied to the melt in the mold, if desired, so that so-called "surface sink" is complemented.

Thereafter, the pressure is released, followed by allowing the melt to stand. This standing time is generally called "cooling time". During a retention time, heat is slowly drawn from the melt toward the mold and thus, the resin temperature in the mold gradually lowers. Accordingly, it is sometimes considered that the retention time is included with a scope of the cooling time.

It will be noted that the standing time after removal of the retention pressure is called "cooling" herein.

The injection rate, injection pressure, injection time, retention pressure and/or retention time is appropriately set depending on the type of resin in a resin composition and the shape of a mold.

The cooling time may be one during which the resin shaped according to the configuration of a mold undergoes crystallization substantially to saturation, and is usually about one minute or below, preferably from about 20 seconds to one minute.

When the melt of a resin composition is packed and retained within a mold that is kept at a temperature within a range of −50 to +30° C. of the crystallization temperature of the resin composition, the polymer capable of taking a crystal structure can be crystallized in the mold. Eventually, the molding cycle can be shortened, thus leading to improved productivity and an improved yield.

It is to be noted that although in the above illustration, the main aim is placed on the crystallization of a resin at the time of molding, the resin molding usually has two problems, which are discussed more particularly as improved by the invention.

In general, the heat-retaining temperature of a mold is set at a level lower than Tg of a resin. When the resin is injected into the mold at such a temperature as indicated above, the heat of the injected resin is rapidly removed with the mold, with the result that the resin is unlikely to flow in the mold. This may cause flow mark defects to appear in the molding surface and weld marks to be very conspicuously observed.

Further, owing to the unlikelihood of flow of the resin, when molding is effected using a mold of a complicated configuration, a increased number of gates have to be used so as to reliably charge a resin in the mold.

This invariably creates runners corresponding to the number of the gates, thus causing the resin to be correspondingly wasted.

On the other hand, the mold temperature in the method of the invention set out hereinbefore is higher than a mold temperature in the related art. Accordingly, the quantity of heat removed from the resin injected into a mold is smaller than in the related art, so that the fluidity of the resin in the mold is better than in the related art.

Thus, the problems on the flow mark defects and weld mark are more unlikely to occur.

Moreover, it is possible to reduce the number of gates over the related art case, thereby enabling an amount of a wasted resin to be reduced at the runners.

It is to be noted that the method of manufacturing a resin molding from the resin composition is not limited to that set out hereinabove, and the molding may be carried out at a mold temperature lower than the glass transition temperature according to an ordinary procedure.

For instance, where polylactic acid is used as a polymer capable of taking a crystal structure, molding may be performed by an ordinary procedure using a mold temperature, for example, of 50° C. that is lower than the glass transition temperature, Tg, of 60° C. of the polylactic acid.

In this case, in order to ensure a heat resistance, although the polymer has to be crystallized through thermal treatment after the molding, polylactic acid is used as a resin composition containing a nucleating agent in the practice of the invention. With the resin composition, the nucleating agent facilitates crystallization, so that a shorter thermal treating time is sufficient for this purpose than that required for the crystallization of known resin compositions.

It will be noted that if it is not required to place an importance on the crystallization of a polymer capable of taking a crystal structure, no thermal treatment may be carried out.

The resin composition of the invention is widely used to provide a diversity of molded products.

The resin moldings of the invention have high crystallinity of the resin composition, so that they are excellent in stiffness and transparency can be further enhanced. Thus, the moldings are suited for use as a product requiring high stiffness and transparency.

For specific applications of resin moldings, mention is made, for example, of parts of electric apparatus such as power generators, electric motors, potential transformers, current transformers, voltage controllers, rectifiers, inverters, relays, contacts for electric power, switches, breakers, knife switches, multiple-electrode rods, cabinets for electric parts, light sockets, various types of terminal boards, plugs, and power modules, sensors, LED lamps, connectors, resistors, relay casings, small-sized switches, coil bobbins, capacitors, casings for variable capacitors, optical pickups, oscillators, transformers, printed circuit boards, tuners, speakers, microphones, head phones, storage devices such as floppy (registered trade mark) disks, MO disks or the like, small-sized motors, magnetic head bases, semiconductors, liquid crystal devices, FDD carriages, FDD chasses, printers such as ink jet printers, thermal transfer printers or the like, ink casings for printers, motor brush holders, electronic parts typical of which are parabola antenna or computer-related parts, VTR parts, television parts, packages of electric or electronic devices such as televisions or personal computers, pressing irons, hair dryers, parts of rice cookers, parts of microwave ovens, audio products or parts of audio devices such as audio laser disks, compact disks or the like, parts of domestic appliances or office equipments such as illumination parts, parts of refrigerators, parts of air conditioners, parts of typewriters or word processors, office computer-related parts, telephone-related parts, facsimile-related parts, duplicator-related arts, cleaning jigs, motor parts, parts of machines such as writers or typewriters, optical instruments such as microscopes, binoculars, cameras, clocks or watches, precise machine-related parts, alternator terminals, alternator connectors, IC regulators, potentiometer bases for light dayer or various valves such as exhaust gas valves, various kinds of pipes for fuel systems, exhaust and intake systems, air intake nozzle snorkels, intake manifolds, fuel pumps, joints for engine cooling water, carburetor main bodies, carburetor spacers, exhaust gas sensors, cooling water sensors, oil temperature sensors, brake pad wear sensors, throttle position sensors, crankshaft position sensors, air flow meters, brake pad abrasion sensors, thermostat bases for air conditioners, air flow control valves for heaters, brush holders for radiator motors, water pump impellers, turbine vanes, wiper motor-related parts, distributors, starter switches, starter relays, wire harnesses for transmission, window washer nozzles, panel switch boards for air conditioners, coils for fuel-related electromagnetic valves, fuse connectors, horn terminals, insulating plates for electric parts, stepping motor rollers, lamp sockets, lamp reflectors, lamp housings, brake pistons, solenoid bobbins, motor car and vehicle-related parts such as engine oil filters or ignition device cases, package materials, etc.

Further, the resin molding may also be applied to as mechanical component parts such as gears, rotary shafts for gears, bearings, racks, pinions, cams, cranks, crank arms, wheels, rundles and the like.

The resin moldings of the invention are improved in crystallinity, so that they are particularly suitable for use as chassis of electric or electronic devices such as televisions, personal computers and the like that require a high heat resistance.

If the resin moldings are made mainly of an aliphatic polyester, particularly polylactic acid, they may be subjected to biodegradation treatment and subsequently discarded after use thereof, with an attendant advantage that an additional energy is not consumed for the disposal.

Examples are shown to illustrate the invention wherein the resin compositions of the invention were prepared to evaluate characteristic properties thereof.

EXAMPLE 1

87 parts by weight of polylactic acid (commercial name of H100J, made by Mitsui Chemicals, Inc.) was provided as a polyester capable of taking a crystal structure. Three parts by weight of carbodiimide (commercial name of Carbodilite HMV-8CA, made by Nisshinbo Industries, Inc.) serving as a hydrolysis inhibitor was added to the polylactic acid. 10 parts by weight of uracil, made by Tokyo Chemical Industry Co., Ltd., was further added as a nucleating agent, followed by kneading while heating at a temperature ranging from 160° C. to 180° C. and pelletizing.

The pellets were provided as a resin composition sample of Example 1.

EXAMPLE 2

90 parts by weight of polylactic acid (commercial name of H100J, made by Mitsui Chemicals, Inc.) was provided as a polyester capable of taking a crystal structure, to which no hydrolysis inhibitor was added, but 10 parts by weight of uracil, made by Tokyo Chemical Industry Co., Ltd., was added as a nucleating agent.

The other conditions were those as used in Example 1 thereby providing a resin composition sample of Example 2.

EXAMPLE 3

The general procedure of Example 1 was repeated except that 6-methyl uracil, made by Tokyo Chemical Industry Co., Ltd., was used instead of uracil, thereby providing a resin composition sample of Example 3.

EXAMPLE 4

The general procedure of Example 2 was repeated except that 6-methyl uracil, made by Tokyo Chemical Industry Co., Ltd., was used instead of uracil, thereby providing a resin composition sample of Example 4.

EXAMPLE 5

99 parts by weight of polylactic acid (commercial name of H100J, made by Mitsui Chemicals, Inc.) was provided as a polyester capable of taking a crystal structure.

One part by weight of uracil, made by Tokyo Chemical Industry Co., Ltd., was added as a nucleating agent.

The other conditions were the same as in Example 1 to provide a resin composition sample of Example 5.

COMPARATIVE EXAMPLE 1

The general procedure of Example 1 was repeated except that 97 parts by weight of polylactic acid (commercial name of H100J, made by Mitsui Chemicals, Inc.) was provided as a polyester capable of taking a crystal structure, to which three parts by weight of carbodiimide (commercial name of Carbodilite HMV-8CA, made by Nisshinbo Industries, Inc.) was added as a hydrolysis inhibitor, but no nucleating agent was added, thereby providing a resin composition of Comparative Example 1.

COMPARATIVE EXAMPLE 2

The general procedure of Example 1 was repeated except that polylactic acid (commercial name of H100J, made by Mitsui Chemicals, Inc.) was provided as a polyester capable of taking a crystal structure, and neither a hydrolysis inhibitor nor a nucleating agent was added, thereby providing a resin composition sample of Comparative Example 2.

COMPARATIVE EXAMPLE 3

The general procedure of Example 1 was repeated except that 90 parts by weight of polylactic acid (commercial name of H100J, made by Mitsui Chemicals, Inc.) was provided as a polyester capable of taking a crystal structure, no hydrolysis inhibitor was added, and 10 parts by weight of phthalhydrazide, made by ACROS, was added, thereby providing a resin composition sample of Comparative Example 3.

COMPARATIVE EXAMPLE 4

The general procedure of Example 1 was repeated except that 90 parts by weight of polylactic acid (commercial name of H100J, made by Mitsui Chemicals, Inc.) was provided as a polyester capable of taking a crystal structure, no hydrolysis inhibitor was added, and 10 parts by weight of talc (commercial name of LMS-200, made by Fuji Talc Industrial Co., Ltd.) was added, thereby providing a resin composition sample of Comparative Example 4.

COMPARATIVE EXAMPLE 5

99 parts by weight of polylactic acid (commercial name of H100J, made by Mitsui Chemicals, Inc.) was provided as a polyester capable of taking a crystal structure, to which one part by weight of talc (commercial name of LMS-200, made by Fuji Talc Industrial Co., Ltd.) was added.

The other conditions were the same as in Example 1, thereby providing a resin composition of Comparative Example 5.

EVALUATIONS

Crystallization Temperature:

The resin composition samples of Examples 1 to 5 and Comparative Examples 1 to 5 were, respectively subjected to measurement of a crystallization temperature according to a Differential Scanning Calorimetric (DSC) method.

That is, individual resin composition samples were each weighed in an amount of 3 mg to 4 mg to provide a cut test piece.

This test piece was placed in an aluminium pan to make a test sample, followed by heating to 200° C. and cooling down at a rate of 20° C. per minute to measure an exothermic peak temperature based on crystallization in the vicinity of 120° C. for determination as a crystallization temperature.

Calorific Value for Crystallization:

The heat quantity at the exothermic peak was determined and rated in terms of weight of a resin composition.

Durability:

For assessment of long-term reliability, the molecular weight of polylactic acid after storage under high temperature and high humidity conditions was measured.

More particularly, several grams of each resin composition sample was placed in a thermostatic chamber of a temperature of 85° C. and a relative humidity of 80%, followed by measurement of a molecular weight after eight hours and after 96 hours, respectively.

The molecular weight was measured by Gel Permeation Chromatography in terms of weight average molecular weight (molecular weight calculated as polystyrene).

A sample was dissolved in chloroform to make a concentration of 0.15 wt % and, after agitation for two hours, the solution was passed through a ϕ0.25 μm filter to provide a sample.

The devices used are indicated below.

Device: Millpore waters 600E system controller
Detector: UV (waters 484) and RI (Waters 410)

Relative to a molecular weight prior to the storage under the high temperature and high humidity conditions, a molecular weight after the storage was rated (indicated by %).

The results of the respective evaluations are shown in Table 3 below.

in a high temperature and high humidity environment, thus revealing that long-term reliability is ensured with respect to material physical properties.

As shown in Example 5, when uracil serving as a nucleating agent in the invention is added in an amount as small as one part by weight, a high crystallization temperature is attained, thus demonstrating that uracil is able to show an excellent effect as a nucleating agent if used in very small amounts. This is considered for the reason that uracil is an organic substance and particles thereof to be added as a nucleating agent can be readily broken into fine pieces.

On the other hand, in Comparative Examples 1 and 2, no crystallization of the resin was observed.

In Comparative Example 3, phthalhydrazide, which has been discussed hereinbefore in relation to Japanese Patent Laid-open Nos. 20004-352872 and 2004-352873, is applied as a nucleating agent and, in Comparative Example 4, talc in the related art is applied as a nucleating agent. The results of these comparative examples reveal that the crystallization temperature is not so improved when compared with the examples of the invention using uracil or 6-methluracil.

Further, as in Comparative Example 5, when talc used as a nucleating agent is added in such a small amount of one part by weight, the crystallization temperature is apparently low in comparison with that of Example 5 using uracil, thus giving evidence that talc is poorer in effect as a nucleating agent. This is considered for the reason that talc is an inorganic material and thus, it is not easy to break it into fine pieces, unlike uracil.

As stated hereinabove, when at least one of uracil and 6-methyluracil is added, as a nucleating agent, to a polyester capable of taking a crystal structure, the crystallization temperature can be effectively increased. Thus, There can be

TABLE 3

|  | Nucleating agent | Hydrolysis inhibitor | Crystallization temperature (° C.) | Calorific Value for crystallization (J/g) | Initial molecular weight (×10⁴) | Retention of molecular weight after 8 hours (%) | Retention of molecular weight after 96 hours (%) |
|---|---|---|---|---|---|---|---|
| Example 1 | Uracil (10 pts. by wt.) | carbodiimide | 111.8 | 33.1 | 15.0 |  | 93 |
| Example 2 | Uracil (10 pts. by wt.) | nil | 116.3 | 34.0 | 12.3 | 64 | — |
| Example 3 | 6-methyl-uracil (10 pt. by wt.) | carbodiimide | 117.0 | 15.6 | 15.2 |  | 90 |
| Example 4 | 6-methyl-uracil (10 pts. by wt.) | nil | 118.7 | 16.7 | 10.8 | 63 | — |
| Example 5 | Uracil (1 pt. by wt.) | nil | 109.1 | 27.1 |  |  |  |
| Comp. Ex. 1 | nil | carbodiimide | not observed | 0 | 14.8 |  | 90 |
| Comp. Ex. 2 | nil | nil | not observed | 0 | 11.2 | 59 | — |
| Comp. Ex. 3 | phthalic-hydrazide (10 pts.by wt.) | nil | 95.0 | 3.7 |  |  |  |
| Comp. Ex. 4 | Talc (10 pts.by wt.) | nil | 108.3 | 30.7 |  |  |  |
| Comp. Ex. 5 | Talc (10 pts.by wt.) | Nil | 103.7 | 30.1 |  |  |  |

In the Table, "—" means a considerable lowering being observed.

It will be seen that in Examples 1 to 5, the crystallization temperatures are all high with high crystallinities of the resin. Reliable progress in crystallization of the resin is supported with the results of the calorific value for crystallization. Thus, resin compositions having practically satisfactory heat resistance and mechanical strength are obtained.

Especially, in Examples 1 and 3 where carbodiimide serving as a hydrolysis inhibitor for polylactic acid is added, the retention of molecular weight is high after long-term storage obtained a resin composition which has a high crystallization temperature and practically satisfactory heat resistance and mechanical strength.

Additionally, it has become apparent that the addition of a hydrolysis inhibitor for the resin ensures long-term reliability of the resins. This makes it easy that where a biodegradable polyester is applied as a resin, satisfactory durability that depends on the type of finally intended molding can be arbitrarily controlled.

Uracil is an element constituting RNA of a living body. When using this substance as a nucleating agent, appropriate biodegradability can be imparted to a final resin composition and moldings obtained therefrom.

While a preferred embodiment of the present invention has been described using specific terms, such description is for illustrative purposes only, and it is to be understood that changes and variations may be made without departing from the spirit or scope of the following claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A resin composition comprising, at least, a polyester capable of forming a crystal structure wherein said polyester consists of polylactic acid, and a nucleating agent, said nucleating agent consisting of a member selected from the group consisting of uracil and uracil derivatives; and a hydrolysis inhibitor for said polyester.

2. The resin composition according to claim 1, wherein said member consists of uracil.

3. The resin composition according to claim 1, wherein said member consists of a uracil derivative.

4. The resin composition according to claim 3, wherein said uracil derivative consists of 6-methyluracil.

5. A resin molding obtained from a resin composition which comprises, at least, polylactic acid, at least one of uracil and a uracil derivative, and a hydrolysis inhibitor for said polylactic acid.

6. The resin composition according to claim 1, wherein the amount of said nucleating agent is in a range from 0.001 part by weight to 10 parts by weight, per 100 parts by weight of polylactic acid.

7. The resin composition according to claim 1, wherein a particle size of the nucleating agent is at about 0.5 μm or below.

* * * * *